(12) United States Patent
Xiao et al.

(10) Patent No.: US 10,671,919 B2
(45) Date of Patent: Jun. 2, 2020

(54) TARGET DETECTION METHOD AND DEVICE, NEURAL NETWORK TRAINING METHOD AND DEVICE

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Tete Xiao, Beijing (CN); Jiayuan Mao, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 15/814,125

(22) Filed: Nov. 15, 2017

(65) Prior Publication Data

US 2018/0174046 A1 Jun. 21, 2018

(30) Foreign Application Priority Data

Dec. 15, 2016 (CN) .......................... 2016 1 1161693

(51) Int. Cl.
*G06K 9/62* (2006.01)
*G06N 3/08* (2006.01)
(Continued)

(52) U.S. Cl.
CPC ........... *G06N 3/08* (2013.01); *G06K 9/00362* (2013.01); *G06K 9/3241* (2013.01); *G06K 9/46* (2013.01);
(Continued)

(58) Field of Classification Search
CPC .......... G06N 3/08; G06N 3/0454; G06N 3/02; G06K 9/00362; G06K 9/629;
(Continued)

(56) References Cited

U.S. PATENT DOCUMENTS 10,410,114 B2 * 9/2019 Kang ................... G06N 3/0454
2015/0070506 A1 3/2015 Chattopadhyay et al.
(Continued)

FOREIGN PATENT DOCUMENTS

| CN | 105810193 | 7/2016 |
| CN | 105976400 | 9/2016 |
| CN | 106203327 | 12/2016 |

OTHER PUBLICATIONS

First Office Action, issued in the corresponding Chinese patent application No. 201611161693.8, dated Mar. 2, 2019, 22 pages.
(Continued)

*Primary Examiner* — Phuoc Tran
(74) *Attorney, Agent, or Firm* — Hamre, Schumann, Mueller & Larson, P.C.

(57) ABSTRACT

This application provides a target detection method and device based on a neural network and training method and device of a neural network for target detection. The target detection method comprises: acquiring a to-be-detected image that contains a target; acquiring first feature information of the to-be-detected image by use of a first neural network, acquiring second feature information of the to-be-detected image by use of a second neural network; combining the first feature information and the second feature information to acquire combined feature information; and acquiring a target detection result by use of the second neural network and based on the combined feature information, wherein the number of layers of the second neural network is larger than the number of layers of the first neural
(Continued)

network, the first feature information is heatmap feature information, and the second feature information is picture feature information.

17 Claims, 7 Drawing Sheets

(51) Int. Cl.
    *G06K 9/32*     (2006.01)
    *G06K 9/46*     (2006.01)
    *G06N 3/04*     (2006.01)
    *G06K 9/00*     (2006.01)

(52) U.S. Cl.
    CPC ......... *G06K 9/4628* (2013.01); *G06K 9/6202* (2013.01); *G06K 9/629* (2013.01); *G06K 9/6271* (2013.01); *G06N 3/0454* (2013.01)

(58) Field of Classification Search
    CPC ...... G06K 9/6271; G06K 9/4628; G06K 9/46; G06K 9/6202; G06K 9/3241; G06K 9/6256
    See application file for complete search history.

(56) References Cited

U.S. PATENT DOCUMENTS

2016/0210551 A1     7/2016   Lee et al.
2018/0165546 A1*   6/2018   Skans ................. G06K 9/6255

OTHER PUBLICATIONS

Second Office Action, issued in the corresponding Chinese patent application No. 201611161693.8, dated Nov. 29, 2019, 25 pages.
Long et al., "Fully Convolutional Networks for Semantic Segmentation", Computer Pattern and Vision Recognition, Mar. 8, 2015, 10 pages.

* cited by examiner

TARGET DETECTION METHOD AND DEVICE, NEURAL NETWORK TRAINING METHOD AND DEVICE

CROSS-REFERENCE TO RELATED APPLICATION

This application claims priority to Chinese patent application No. 201611161693.8 filed on Dec. 15, 2016, the entire contents of which are incorporated herein by reference.

TECHNICAL FIELD

The present disclosure relates to the field of image processing, and more particularly, to target detection method and device based on a neural network and training method and device of a neural network for target detection.

BACKGROUND

Target detection is a basic research topic in the field of computer vision, it has wide application prospect in many aspects such as face recognition, safety monitoring, and dynamic tracking. Target detection refers to detecting and identifying a specific target (such as a pedestrian) for any given image, and returning location and size information of the target, for example, outputting a border box that surrounds the target. Target detection is a complex and challenging mode detection problem, internal changes such as detail change of the target, occlusion, and external condition changes such as imaging angle, light effect, focal length of imaging device, imaging distance, image access difference, both will lead to difficulties in target detection and reduce accuracy.

Neural network is a large-scale, multi-parameter optimization tool. Depending on a lot of training data, neural network can learn hidden features that are difficult to summarize in the data, thus completing a number of complex tasks, such as face detection, picture classification, object detection, action tracking, natural language translation. Neural network has been widely used in the field of artificial intelligence. At present, the most widely used neural network in target detection, such as pedestrian detection, is convolutional neural network. There are two main problems that plague the current pedestrian target detection method: first, generation of a large number of "false positive" detection results, that is, a non-target area is marked as a target; second, incapability of automatically detecting some targets from the neural network due to light, target gestures and other effects. This is because during training and detection of the neural network for target detection, a position of the target in the picture is always generated directly, without fully considering division of this process and iterative training for the network, nor considering other factors that can assist in training and improving detection accuracy.

SUMMARY

The present disclosure is provided in view of the above problems. The present disclosure provides target detection method and device based on a neural network and training method and device of a neural network for target detection. By using the first neural network training that uses position information to assist in generating a heatmap and the subsequent second neural network training that uses the heatmap to assist in generating a target position, and further iterating the first neural network training and the second neural network training until trained neural networks are obtained, the trained neural networks perform heatmap and target position detection on a to-be-detected image, in order to achieve higher detection accuracy.

According to an embodiment of the present disclosure, there is provided a target detection method, comprising: acquiring a to-be-detected image that contains a target; acquiring first feature information of the to-be-detected image by use of a first neural network that has been trained in advance, acquiring second feature information of the to-be-detected image by use of a second neural network that has been trained in advance; combining the first feature information and the second feature information to acquire combined feature information; and acquiring a target detection result by use of the second neural network and based on the combined feature information, wherein the number of layers of the second neural network is larger than the number of layers of the first neural network, the first feature information is heatmap feature information, and the second feature information is picture feature information In addition, the target detection method according to an embodiment of the present disclosure further comprises training the first neural network and the second neural network.

In addition, in the target detection method according to an embodiment of the present disclosure, training the first neural network and the second neural network comprises: adjusting a first network parameter of the first neural network by use of training images labeled with training targets to train the first neural network until a first loss function of the first neural network satisfies a first predetermined threshold condition, and obtaining the first neural network that is being trained; adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

In addition, in the target detection method according to an embodiment of the present disclosure, training the first neural network and the second neural network further comprises: repeating execution of the following training: adjusting the first network parameter by use of the training images and training second feature information outputted with respect to the training images by the second neural network that is being trained, to train the first neural network; and adjusting the second network parameter by use of the training images and the training first feature information outputted with respect to the training images by the first neural network that is being trained, to train the second neural network, until both the first loss function and the second loss function satisfy a third predetermined threshold condition, obtaining the trained first neural network and the trained second neural network.

In addition, in the target detection method according to an embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

In addition, in the target detection method according to an embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the target detection method according to an embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

According to another embodiment of the present disclosure, there is provided a target detection device, comprising: an image acquisition module for acquiring a to-be-detected image that contains a target; a target detection module that comprises a first neural network and a second neural network, the first neural network being for acquiring first feature information of the to-be-detected image, the second neural network being for acquiring second feature information of the to-be-detected image, wherein the second neural network further combines the first feature information and the second feature information to acquire combined feature information, and acquires a target detection result based on the combined feature information, wherein the number of layers of the second neural network is larger than the number of layers of the first neural network, the first feature information is heatmap feature information, and the second feature information is picture feature information.

In addition, the target detection method according to another embodiment of the present disclosure further comprises a training module for training the first neural network and the second neural network.

In addition, in the target detection method according to another embodiment of the present disclosure, the training module comprises a first training unit and a second training unit: the first training unit adjusts a first network parameter of the first neural network by use of training image labeled with training targets to train the first neural network until a first loss function of the first neural network satisfies a first predetermined threshold condition, and obtains the first neural network that is being trained; the second training unit adjusts a second network parameter of the second neural network by use of the training images and training first feature information outputted with respect to the training images by the first neural network, to train the second neural network until a second loss function of the second neural network satisfies a second predetermined threshold condition, and obtains the second neural network that is being trained.

In addition, in the target detection method according to another embodiment of the present disclosure, the first training unit and the second training unit repeat execution of the following training, respectively: the first training unit adjusts the first network parameter by use of the training images and training second feature information outputted with respect to the training images by the second neural network that is being trained, to train the first neural network; and the second training unit adjusts the second network parameter by use of the training images and the training first feature information outputted with respect to the training images by the first neural network that is being trained, to train the second neural network, until both the first loss function and the second loss function satisfy a third predetermined threshold condition, the trained first neural network and the trained second neural network are obtained.

In addition, in the target detection method according to another embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

In addition, in the target detection method according to another embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the target detection method according to another embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

According to another embodiment of the present disclosure, there is provided a training method of a neural network for target detection, the neural network for target detection comprising a first neural network and a second neural network, the training method comprising: adjusting a first network parameter of the first neural network by use of training images labeled with training targets to train the first neural network until a first loss function of the first neural network satisfies a first predetermined threshold condition, and obtaining the first neural network that is being trained; adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

In addition, the target training method according to another embodiment of the present disclosure further comprises repeating execution of the following training: adjusting the first network parameter by use of the training images and training second feature information outputted with respect to the training images by the second neural network that is being trained, to train the first neural network; and adjusting the second network parameter by use of the training images and the training first feature information outputted with respect to the training images by the first neural network that is being trained, to train the second neural network, until both the first loss function and the second loss function satisfy a third predetermined threshold condition, obtaining the trained first neural network and the trained second neural network.

In addition, in the training method according to another embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

In addition, in the training method according to another embodiment of the present disclosure, the first neural network is for acquiring first feature information of the to-be-detected image, the second neural network is for acquiring second feature information of the to-be-detected image; the second neural network further combines the first feature information and the second feature information to acquire combined feature information, and acquires a target detection result by use of the second neural network and based on the combined feature information, the number of layers of the second neural network is larger than the number of layers of the first neural network, the first feature information is heatmap feature information, and the second feature information is picture feature information.

In addition, in the training method according to another embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the training method according to another embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

According to another embodiment of the present disclosure, there is provided a training device for a neural network for target detection, the neural network for target detection comprising a first neural network and a second neural network, the training device comprising: a first training unit for adjusting a first network parameter of the first neural network by use of training images labeled with training targets to train the first neural network until a first loss function of the first neural network satisfies a first predetermined threshold condition, and obtaining the first neural network that is being trained; a second training unit for adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

In addition, the target training device according to another embodiment of the present disclosure further comprises the first training unit and the second training unit repeat execution of the following training, respectively: the first training unit adjusts the first network parameter by use of the training images and training second feature information outputted with respect to the training images by the second neural network that is being trained, to train the first neural network; and the second training unit adjusts the second network parameter by use of the training images and the training first feature information outputted with respect to the training images by the first neural network that is being trained, to train the second neural network, until both the first loss function and the second loss function satisfy a third predetermined threshold condition, the trained first neural network and the trained second neural network are obtained.

In addition, in the training device according to another embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence, and a difference between a prediction confidence of a bounding box that contains the target and a true confidence thereof.

In addition, in the training device according to another embodiment of the present disclosure, the first neural network is for acquiring first feature information of the to-be-detected image, the second neural network is for acquiring second feature information of the to-be-detected image; the second neural network further combines the first feature information and the second feature information to acquire combined feature information, and acquires a target detection result by use of the second neural network and based on the combined feature information, the number of layers of the second neural network is larger than the number of layers of the first neural network, the first feature information is heatmap feature information, and the second feature information is picture feature information.

In addition, in the training device according to another embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the training device according to another embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

According to another embodiment of the present disclosure, there is provided a target detection device, comprising: a processor, a memory in which computer program instructions configured to execute the following steps when being run by a processor are stored: acquiring a to-be-detected image that contains a target; acquiring first feature information of the to-be-detected image by use of a first neural network that has been trained in advance, acquiring second feature information of the to-be-detected image by use of a second neural network that has been trained in advance; combining the first feature information and the second feature information to acquire combined feature information; and acquiring a target detection result by use of the second neural network and based on the combined feature information, wherein the number of layers of the second neural network is larger than the number of layers of the first neural network, the first feature information is heatmap feature information, and the second feature information is picture feature information.

In addition, in the target detection device according to another embodiment of the present disclosure, the computer program instructions are further for, when being run by a processor, training the first neural network and the second neural network.

In addition, in the target detection device according to another embodiment of the present disclosure, training the first neural network and the second neural network further executed by the computer program instructions when being run by the processor comprises: adjusting a first network parameter of the first neural network by use of training images labeled with training targets to train the first neural network until a first loss function of the first neural network satisfies a first predetermined threshold condition, and obtaining the first neural network that is being trained; adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

In addition, in the target detection device according to another embodiment of the present disclosure, training the first neural network and the second neural network further executed by the computer program instructions when being run by the processor further comprises: repeating execution of the following training: adjusting the first network parameter by use of the training images and training second feature information outputted with respect to the training images by the second neural network that is being trained, to train the first neural network; and adjusting the second network parameter by use of the training images and the training first feature information outputted with respect to the training images by the first neural network that is being trained, to train the second neural network, until both the first loss function and the second loss function satisfy a third predetermined threshold condition, obtaining the trained first neural network and the trained second neural network.

In addition, in the target detection device according to another embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

In addition, in the target detection device according to another embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the target detection device according to another embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

According to another embodiment of the present disclosure, there is provided a training device for a neural network for target detection, the neural network for target detection comprising a first neural network and a second neural network, the training device comprising: a processor, a memory in which computer program instructions configured to execute the following steps when being run by a processor are stored: a first training unit for adjusting a first network parameter of the first neural network by use of training images labeled with training targets to train the first neural network until a first loss function of the first neural network satisfies a first predetermined threshold condition, and obtaining the first neural network that is being trained; a second training unit for adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

In addition, in the training device according to another embodiment of the present disclosure, the computer program instructions are further for executing the following steps, when being run by a processor: repeating execution of the following training: adjusting the first network parameter by use of the training images and training second feature information outputted with respect to the training images by the second neural network that is being trained, to train the first neural network; and adjusting the second network parameter by use of the training images and the training first feature information outputted with respect to the training images by the first neural network that is being trained, to train the second neural network, until both the first loss function and the second loss function satisfy a third predetermined threshold condition, obtaining the trained first neural network and the trained second neural network.

In addition, in the training device according to another embodiment of the present disclosure, the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

In addition, in the training device according to another embodiment of the present disclosure, the first neural network is for acquiring first feature information of the to-be-detected image, the second neural network is for acquiring second feature information of the to-be-detected image; the second neural network further combines the first feature information and the second feature information to acquire combined feature information, and acquires a target detection result by use of the second neural network and based on the combined feature information, the number of layers of the second neural network is larger than the number of layers of the first neural network, the first feature information is heatmap feature information, and the second feature information is picture feature information.

In addition, in the training device according to another embodiment of the present disclosure, the second neural network comprises: a feature input layer for acquiring the second feature information based on the to-be-detected image that is inputted; a first feature combination layer for combining the first feature information and the second feature information to acquire the combined feature information; and a target detection layer for acquiring a target detection result based on the combined feature information; and the first neural network comprises: a feature conversion layer for acquiring conversion feature information based on the second feature information; and a heat detection layer for acquiring the first feature information based on the conversion feature information.

In addition, in the training device according to another embodiment of the present disclosure, the first neural network further comprises an upsampling layer for upsampling the conversion feature information such that the heat detection layer receives upsampled conversion feature information with a size the same as a size of the to-be-detected image; the heat detection layer comprises: a second feature combination layer for receiving the upsampled conversion feature information to generate initial first feature information; a downsampling layer for downsampling the initial first feature information to obtain the first feature information with a dimension the same as a dimension of the second feature information; and a heat target prediction layer for obtaining a heat target prediction result based on the initial first feature information.

It is to be understood that both the foregoing general descriptions and the following detailed descriptions are exemplary and intended to provide further explanations of the claimed technique.

BRIEF DESCRIPTION OF THE DRAWINGS

Through the more detailed description of the embodiments of the present disclosure in combination with the accompanying drawings, the above and other objects, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

The present disclosure relates to target detection method and device based on a neural network, training method and device of a neural network for target detection. Performing target detection by use of the neural network may be divided into two phases, i.e., a training phase and a detecting phase. The training phase refers to that it needs to first train the neural network by use of training targets, so as to adjust parameters of the neural network; the detecting phase refers to subsequently using the trained neural network to perform target detection on a to-be-detected image that contains a detection target. Hereinafter, respective embodiments of the present disclosure will be described in detail with reference to the drawings.

Figure 1:
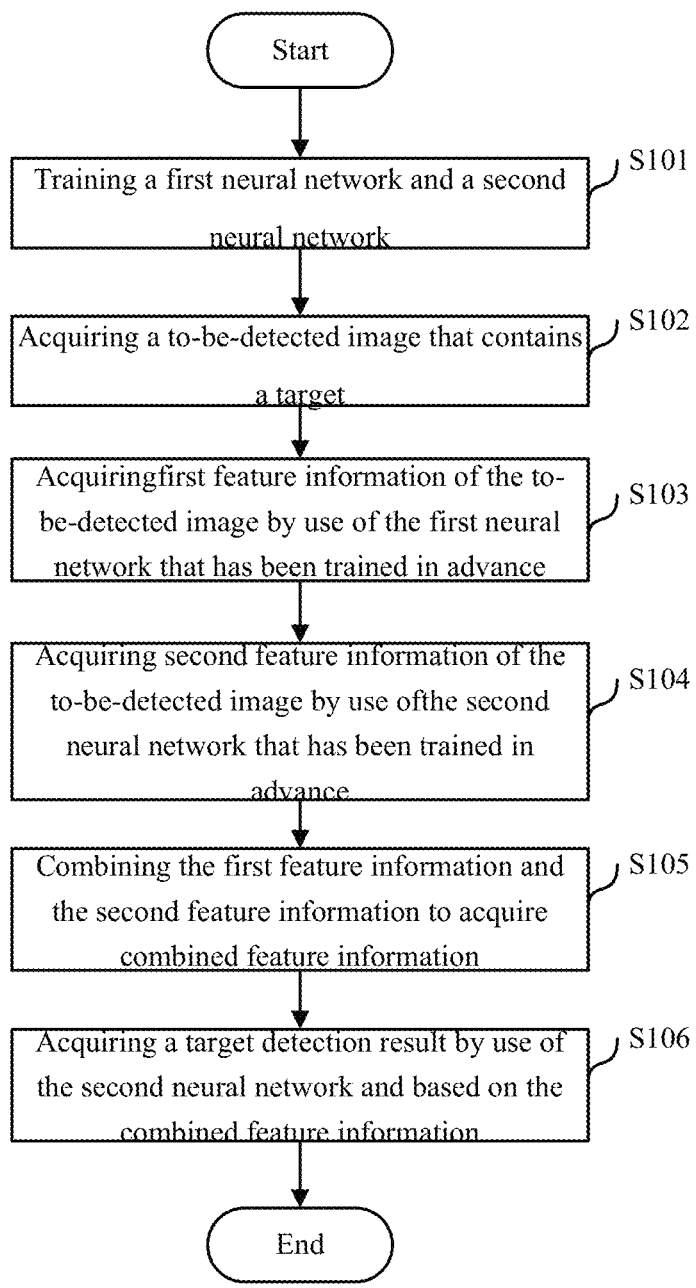
FIG. 1 is a flowchart illustrating a target detection method according to an embodiment of the present disclosure.

First, a target detection method according to an embodiment of the present disclosure is briefed with reference to FIG. 1.

FIG. 1 is a flowchart illustrating a target detection method according to an embodiment of the present disclosure. As shown in FIG. 1, the target detection method according to an embodiment of the present disclosure comprises the following steps.

In step S101, a first neural network and a second neural network are trained.

As will be described in detail below, in the first and second neural networks of the present disclosure, the first neural network is a relatively shadow neural network and the second neural network is a relatively deep neural network. The number of layers of the second neural network is greater than the number of layers of the first neural network. Further, the first neural network may be used to obtain first feature information of a to-be-detected image, the second neural network may be used to obtain second feature information of the to-be-detected picture. As will be described in detail below, the first feature information is heatmap feature information, and the second feature information is picture feature information. In addition, the training method of the first neural network and the second neural network will be described in detail below with reference to the drawings. It is to be understood that the target detection method according to an embodiment of the present disclosure may certainly exclude step S101 in FIG. 1, instead, target detection may be performed directly using trained first and second neural networks. Thereafter, the processing proceeds to step S102.

In step S102, a to-be-detected image that contains a target is acquired. In an embodiment of the present disclosure, a monitoring camera capable of acquiring image data in a monitoring scene may be configured in a monitoring scene as the image acquisition module. Acquiring a to-be-detected image that contains a target includes, but not limited to, after image data is acquired by an image acquisition module disposed physically separated, receiving video data transmitted from the image acquisition module via a wired or wireless manner. Alternatively, the image acquisition module may be located on the same position or even within the same housing with other modules or components in the target detection device, said other modules or components in the target detection device receive image data transmitted from the image acquisition module via an internal bus. The to-be-detected image may be an original image acquired by the image acquisition module, and may also be an image obtained after pre-processing the original image. Thereafter, the processing proceeds to step S103.

In step 103, first feature information of the to-be-detected image is acquired by use of a first neural network that has been trained in advance. As described above, the first feature information is heatmap feature information. More specifically, the heatmap is used to indicate a probability for that each pixel dot belongs to a target. Thereafter, the processing proceeds to step S104.

In step S104, second feature information of the to-be-detected image is acquired by use of a second neural network that has been trained in advance. For example, an convolution operation may be performed on the to-be-detected image by a convolution layer of the second neural network to extract the picture feature information. It is easy to understand that an execution order of steps S103 and S104 shown in FIG. 1 is merely illustrative. Alternatively, steps S103 and S104 may be performed simultaneously or in a reverse order. Thereafter, the processing proceeds to step S105.

In step S105, the first feature information and the second feature information are combined to acquire combined feature information. Hereinafter, structures of the first neural network and second neural network as well as the process of the acquiring and combining the first feature information and the second feature information by the first neural network and the second neural network will be further described in detail with reference to the drawings. Thereafter, the processing proceeds to step S106.

In step S106, a target detection result is acquired by use of the second neural network and based on the combined feature information. In an embodiment of the present disclosure, in step S106, a detection bounding box that contains a target may be obtained by use of the second neural network and based on the combined feature information, and the detection bounding box is taken as a target detection result. In addition, the target detection result may include a confidence corresponding to each detection bounding box for indicating a probability of existence of an object in the bounding box. For the same detection target, the resulting detection bounding box may be more than one. When the detection bounding box corresponding to the same detection target is multiple, the respective detection bounding boxes can be merged, so that one accurate detection bounding box is obtained by merging for the same detection target. For example, the respective detection bounding boxes can be merged by use of a non-maximum suppression method to eliminate redundant bounding boxes. When each detection target corresponds to only one detection bounding box, the bounding box combination can be omitted. Finally, a final target detection result is outputted in the form of the detection target surrounded by the detection bounding box.

Figure 2:
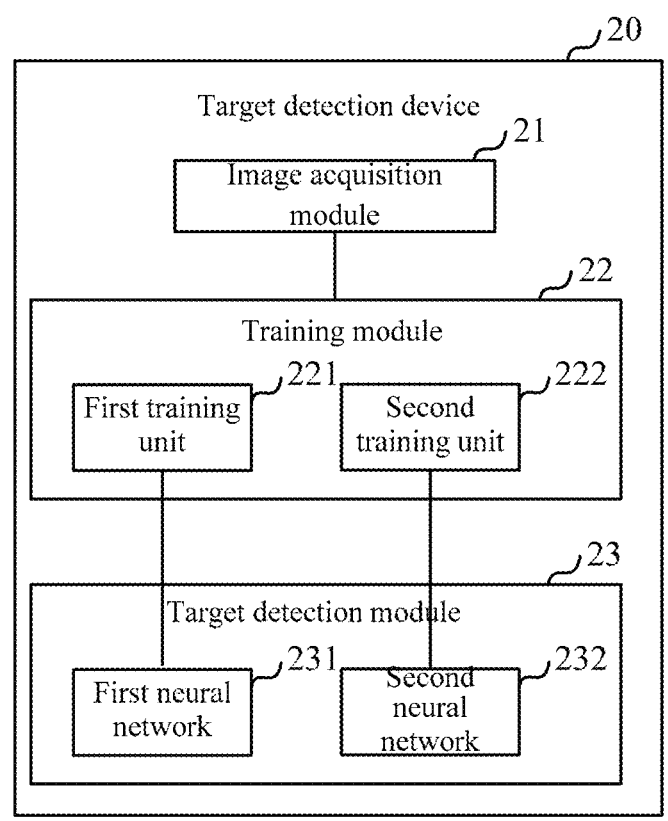
FIG. 2 is a block diagram illustrating a target detection device according to an embodiment of the present disclosure.

FIG. 2 is a block diagram illustrating a target detection device according to an embodiment of the present disclosure. The target detection device 20 according to an embodiment of the present disclosure as shown in FIG. 2 may be used to execute the target detection method according to an embodiment of the present disclosure as shown in FIG. 1. As shown in FIG. 2, the target detection device 20 according to an embodiment of the present disclosure comprises an image acquisition module 21, a training module 22, and a target detection module 23.

Specifically, the image acquisition module 21 is for acquiring a to-be-detected image that contains a target. In an embodiment of the present disclosure, the image acquisition module 21 may be a monitoring camera capable of acquiring image data in a monitoring scene configured in the monitoring scene. The image acquisition module 21 may be configured physically separated from the subsequent training module 22 and target detection module 23 and so on, and transmit image data from the image acquisition module 21 to the subsequent respective modules in a wired or wireless manner. Alternatively, the image acquisition module may be located on the same position or even within the same housing with other modules or components in the target detection device 20, said other modules or components in the target detection device 20 receive image data transmitted from the image acquisition module 21 via an internal bus. In addition, in the phase for executing neural network training, the image acquisition module 21 may further supply the training images in which the training targets are marked to the training module 22 so as to execute training of the neural network.

The training module 22 is for executing training of the neural network. As shown in FIG. 2, in an embodiment of the present disclosure, the training module 22 comprises a first training unit 221 for executing training of the first neural network 231 contained in the target detection module 23, and a second training unit 222 for executing training of the second neural network 232 contained in the target detection module 23. Hereinafter, the training method executed by the training module 22 will be described in further detail with reference to FIG. 3.

The first neural network 231 contained in the target detection module 23 is for acquiring first feature information of the to-be-detected image, the second neural network 232 contained in the target detection module 23 is for acquiring second feature information of the to-be-detected image. The first neural network is a relatively shadow neural network and the second neural network is a relatively deep neural network. The number of layers of the second neural network is greater than the number of layers of the first neural network. Specifically, the first feature information is heatmap feature information, and the second feature information is picture feature information. The heatmap generated by the first neural network 231 is used to indicate a probability for that each pixel dot belongs to a target. The second neural network 232 can perform convolution operation on the to-be-detected image by the convolution layer so as to extract picture feature image. Further, the second neural network 232 can further combine the first feature information and the second feature information to obtain combined feature information, and obtain a target detection result based on the combined feature information. For example, the second neural network 232 can obtain a detection bounding box that contains a target based on the combined feature information, and take the detection bounding box as a target detection result. In addition, the target detection result may include a confidence corresponding to each detection bounding box, the confidence indicates a probability of existence of an object in the bounding box. For the same detection target, the resulting detection bounding box may be more than one. When the detection bounding box corresponding to the same detection target is multiple, the respective detection bounding boxes can be merged, so that one accurate detection bounding box is obtained by merging for the same detection target. For example, the respective detection bounding boxes can be merged by use of a non-maximum suppression method to eliminate redundant bounding boxes. When each detection target corresponds to only one detection bounding box, the bounding box combination can be omitted. Finally, a final target detection result is outputted in the form of the detection target surrounded by the detection bounding box.

As described above, by adopting the target detection method and target detection device according to an embodiment of the present disclosure as described above with reference to FIGS. 1 and 2, and with interactive assisting and iterative training of the first neural network for generating a heatmap and the second neural network for generating a target position, and further iterating training of the first neural network and training of the second neural network, until trained neural networks are obtained, the trained neural networks perform heatmap and target position detection on the to-be-detected image, thus achieving output of the heatmap and target position detection result with a high accuracy.

Figure 3:
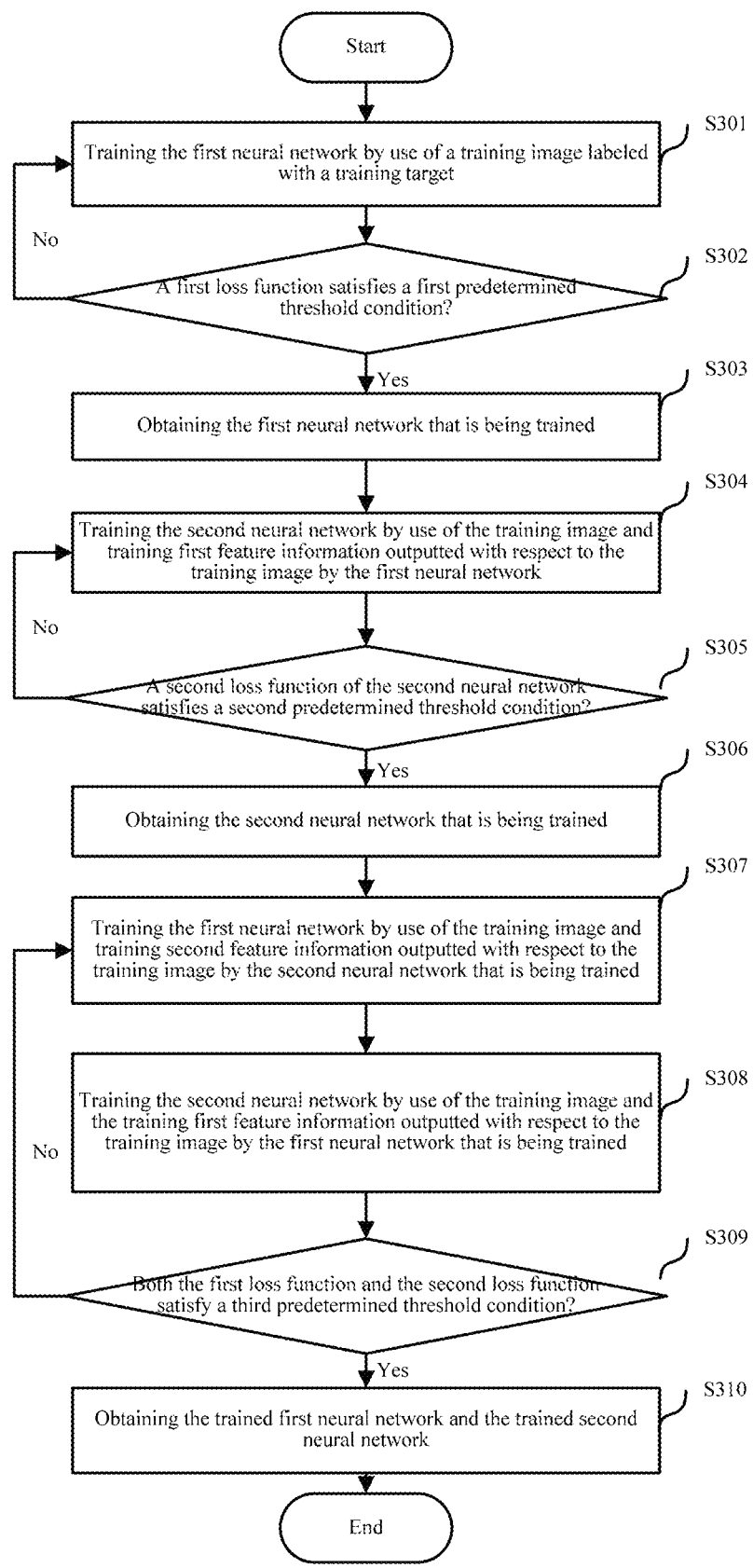
FIG. 3 is a flowchart illustrating a training method of a neural network for target detection according to an embodiment of the present disclosure.

FIG. 3 is a flowchart illustrating a training method of a neural network for target detection according to an embodiment of the present disclosure. As shown in FIG. 3, the training method of a neural network for target detection generally comprises an initial training phase of the first neural network and the second neural network (steps S301 to S306), and an iterative training phase of the first neural network and the second neural network (step S307 and S310). Specifically, the training method of the neural network for target detection comprises the following steps.

In step S301, the first neural network is trained by use of the training images marked with the training targets. In an embodiment of the present disclosure, a first network parameter of the first neural network is adjusted by use of training images labeled with training targets to train the first neural network. As described above, the first neural network is a shadow neural network for generating a heatmap. During the training process, a first loss function corresponding to a specific first network parameter is generated. The first loss function indicates a difference between a prediction confidence of a pixel dot in the training images belongs to a training target as predicted by the first neural network and a true confidence thereof. Thereafter, the processing proceeds to step S302.

In step S302, it is determined whether the first loss function satisfies a first predetermined threshold condition. In an embodiment of the present disclosure, the first predetermined threshold condition corresponds to minimization of the first loss function under input of a certain training image.

If a negative result is obtained in step S302, that is, the first loss function does not satisfy the first predetermined threshold condition, then the processing returns to step S301, so as to continuously execute the initial training of the first neural network. Conversely, if a positive result is obtained in step S302, that is, the first loss function satisfies the first predetermined threshold condition, then the processing proceeds to step S303, the first neural network that is being trained is obtained. Thereafter, the processing proceeds to step S304.

In step S304, the second neural network is trained by use of the training images and training first feature information outputted by the first neural network with respect to the training images. In an embodiment of the present disclosure, training first feature information (heatmap information) outputted by the first neural network with respect to the training images is used to assist in training the second neural network. That is to say, a second network parameter of the second neural network is adjusted by use of the training images and training heatmap information outputted by the first neural network with respect to the training images, to train the second neural network. As described above, the second neural network is a deep neural network for executing target detection. During the training process, a second loss function corresponding to a specific second network parameter is obtained, the second loss function indicates a difference between a prediction confidence of a target in the training images as predicted by the second neural network and a true confidence thereof, and a difference between a prediction confidence of a bounding box that contains the target and a true confidence thereof. Thereafter, the processing proceeds to step S305.

In step S305, it is determined whether the second loss function satisfies a second predetermined threshold condition. In an embodiment of the present disclosure, the second predetermined threshold condition corresponds to minimization of the second loss function under input of a certain training image.

If a negative result is obtained in step S305, that is, the second loss function does not satisfy the second predetermined threshold condition, then the processing returns to step S304, so as to continuously execute initial training of the second neural network. Conversely, if a positive result is obtained in step S305, that is, the second loss function satisfies the second predetermined threshold condition, then the processing returns to step S306, the second neural network that is being trained is obtained. At this point, the initial training phase of the first neural network and the second neural network is completed, the first neural network and the second neural network that have been initially trained are obtained. Thereafter, the subsequent iterative training phase of the first neural network and the second neural network is further performed in order to obtain a neural network capable of achieving more accurate heatmap prediction and target detection.

In step S307, the first neural network is trained by use of the training images and the training second feature information outputted with respect to the training images by the second neural network that is being trained. In an embodiment of the present disclosure, during the iterative training process, the training second feature information (i.e., target detection information) outputted with respect to the training images by the second neural network that is being trained is used to assist in training of the first neural network. That is to say, the first network parameter is adjusted continuously by use of the training images and the training target detection information outputted with respect to the training images by the second neural network that is being trained, to train the first neural network, and in this case, the second network parameter of the second neural network is fixed (that is, a learning rate of the second neural network is set as zero). Thereafter, the processing proceeds to step S308.

In step S308, the second neural network is trained by use of the training images and the training first feature information outputted with respect to the training images by the first neural network that is being trained. In an embodiment of the present disclosure, during the iterative training process, the training first feature information (i.e., heatmap information) outputted with respect to the training images by the first neural network that is being trained is used to assist in training the second neural network. That is to say, the second network parameter is adjusted continuously by use of the training images and the training first feature information outputted with respect to the training images by the first neural network that is being trained, to train the second neural network, and in this case, the first network parameter of the first neural network is fixed (that is, a learning rate of the first neural network is set as zero). Thereafter, the processing proceeds to step S309.

In step S309, it is determined whether the first loss function and the second loss function both satisfy the third predetermined threshold condition. The third predetermined threshold condition is minimization of, for a specific training image, a difference between a prediction confidence of a pixel dot in the training image belongs to a training target as predicted by the first neural network and a true confidence thereof, a difference between a prediction confidence of a target in the training image as predicted by the second neural network and a true confidence thereof, and a difference between a prediction confidence of a bounding box that contains the target and a true confidence thereof.

If a negative result is obtained in step S309, then the processing returns to step S307, so as to execute a next round of iterative training. Conversely, if a positive result is obtained in step S309, that is, the first loss function and the second loss function both satisfy the third predetermined threshold condition, then the processing returns to step S310, the first neural network and the second neural network that have been trained are obtained. At this point, the iterative training phase of the first neural network and the second neural network is completed, the first neural network capable of accurately outputting a heatmap result and the second neural network capable of outputting a target detection result concurrently are obtained.

Figure 4:
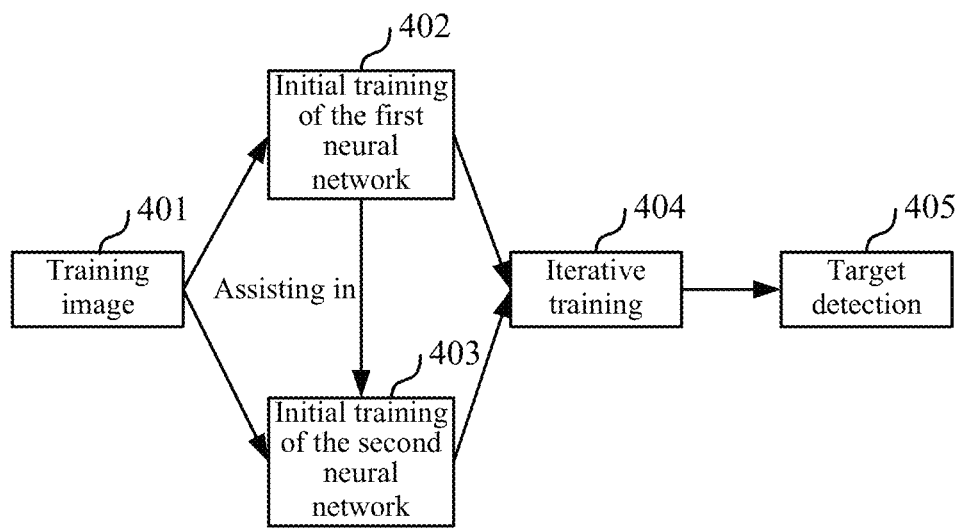
FIG. 4 is a schematic diagram illustrating initial training in a training method of a neural network for target detection according to an embodiment of the present disclosure.
Figure 5:
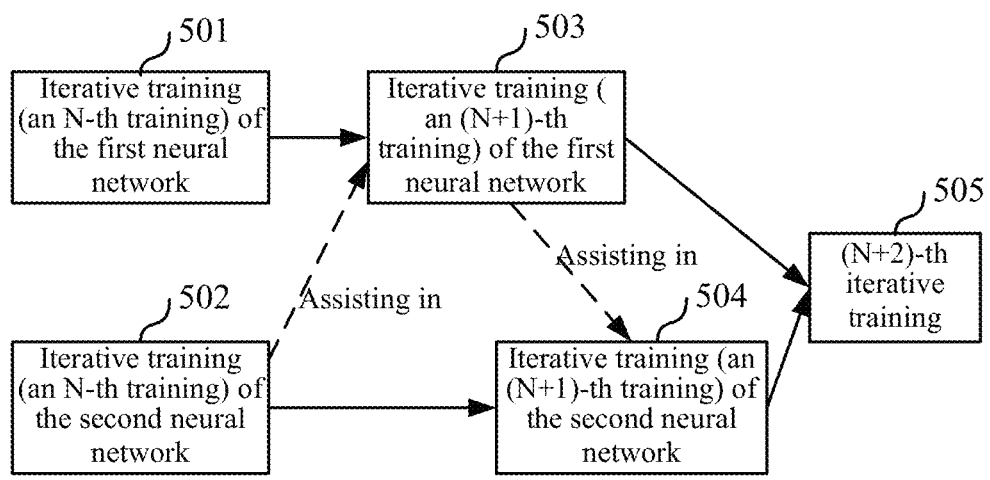
FIG. 5 is a schematic diagram illustrating iterative training in a training method of a neural network for object detection according to an embodiment of the present disclosure.

To facilitate the understanding, FIG. 4 and FIG. 5 schematically show initial training and iterative training in the training method of a neural network for target detection according to an embodiment of the present disclosure, respectively.

FIG. 4 is a schematic diagram illustrating initial training in a training method of a neural network for target detection according to an embodiment of the present disclosure. As shown in FIG. 4, the training images 401 first are applied to initial training 402 of the first neural network (i.e., corresponding to steps S301-S303). Thereafter, with the aid of the first neural network, the training images 401 are used to perform initial training 403 (i.e., corresponding to steps S304-S306) of the second neural network. Thereafter, the processing proceeds to iterative training 404 of the first neural network and the second neural network, and the first neural network and the second neural network have been iteratively trained will be further used for target detection 405. FIG. 3 and FIG. 4 both show, during the initial training process, first, initial training of the first neural network is executed, thereafter, the first neural network assists in initial training of the second neural network. As will be easily understood, the present disclosure is not limited thereto, instead, it is possible to execute the initial training of the second neural network first and thereafter the second neural network assists in initial training of the first neural network.

FIG. 5 is a schematic diagram illustrating iterative training (i.e., iterative training 404 in FIG. 4) in a training method of a neural network for object detection according to an embodiment of the present disclosure. After iterative training 501 (an N-th training) of the first neural network and iterative training 502 (an N-th training) of the second neural network, it further proceeds to an (N+1)-th iterative training. During the (N+1)-th iterative training, the second neural network after being trained N times assists in execution of (N+1)-th iterative training 503 (i.e., corresponding to step S307) of the first neural network; thereafter, the first neural network that has been trained N+1 times is used to assist in (N+1)-th iterative training 504 (i.e., corresponding to step S308) of the second neural network. After the (N+1)-th iterative training, if the first neural network and the second neural network do not satisfy the predetermined third threshold condition, then an (N+2)-th iterative training 505 is further executed.

By using the training method of a neural network for target detection according to an embodiment of the present disclosure as described with reference to FIGS. 3 to 5, and by using position information to assist in training of the first neural network that generates a heatmap, thereafter, using the heatmap to assist in training of the second neural network that generates a target position, and further iterating the mutual assisted training of the first neural network and the second neural network, until the neural networks capable of executing heatmap detection and target detection with a high accuracy are obtained.

Figure 6:
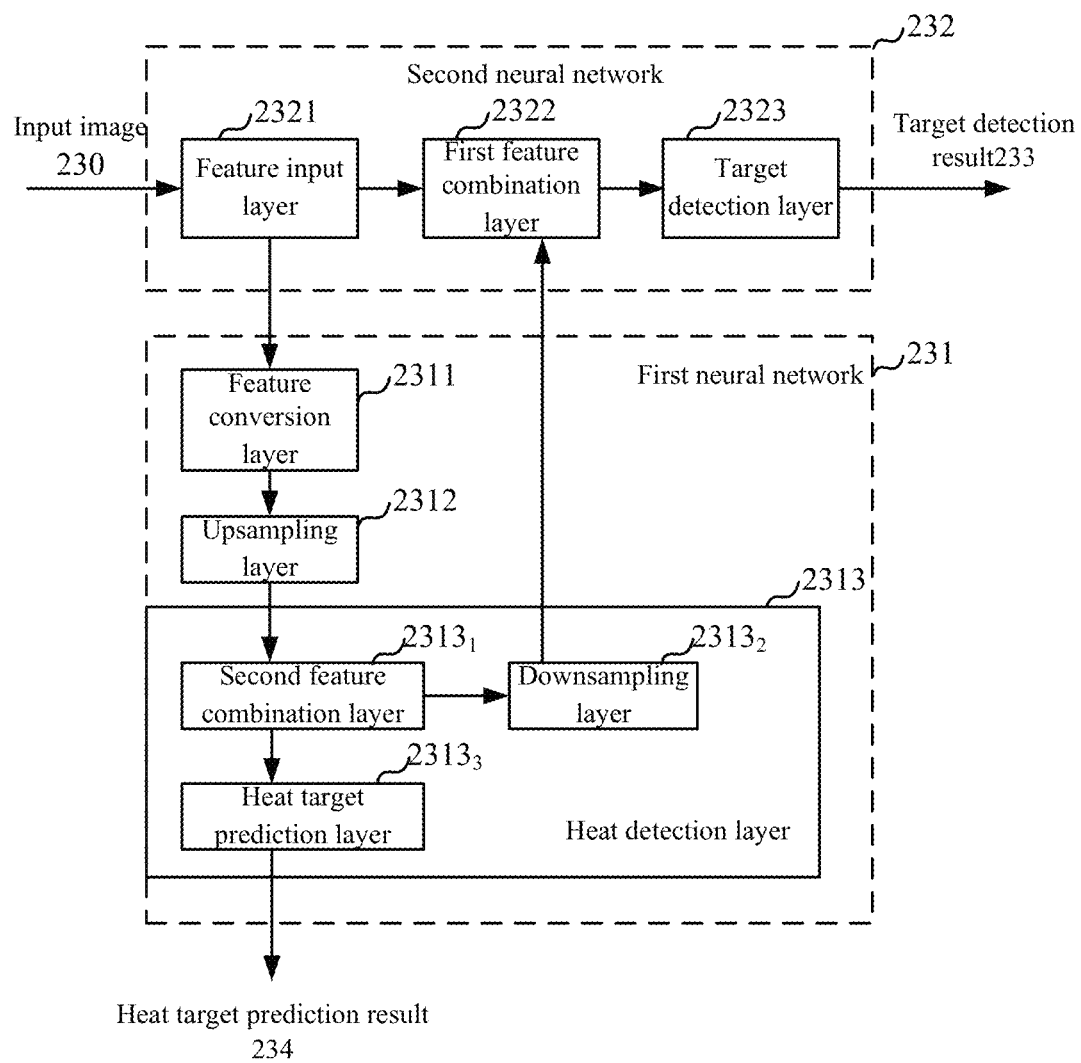
FIG. 6 is a schematic diagram illustrating structure of a neural network for target detection according to an embodiment of the present disclosure.

FIG. 6 is a schematic diagram illustrating structure of a neural network for target detection according to an embodiment of the present disclosure. As described above, the neural network for target detection according to an embodiment of the present disclosure comprises a first neural network 231 and a second neural network 232.

Specifically, the second neural network 232 comprises a feature input layer 2321, a first feature combination layer 2322, and a target detection layer 2323. The first neural network 231 comprises a feature conversion layer 2311 and a heat detection layer 2313, wherein the heat detection layer 2313 further comprises a second feature combination layer $2313_1$, a downsampling layer $2313_2$, and a heat target prediction layer $2313_3$.

The to-be-detected image 230 that is inputted first enters into the feature input layer 2321 of the second neural network 232, the feature input layer 2321 acquires the second feature information (i.e., picture feature information) based on the to-be-detected image 230 that is inputted. The second feature information enters the first neural network 231, the feature conversion layer 2311 acquires conversion feature information based on the second feature information. Thereafter, the upsampling layer 2312 upsamples the conversion feature information such that the heat detection layer receives upsampled conversion feature information with a size the same as a size of the to-be-detected image. Next, the upsampled conversion feature information enters the heat detection layer 2313 of the first neural network 231.

The second feature combination layer $2313_1$ in the heat detection layer 2313 receives the upsampled conversion feature information, so as to generate the initial first feature information (i.e., heatmap feature information). Thereafter, the heat target prediction layer $2313_3$ acquires a heat target prediction result 234 based on the initial first feature information.

On the other hand, the downsampling layer $2313_2$ downsamples the initial first feature information, so as to obtain the first feature information with a dimension the same as a dimension of the second feature information, and feeds the first feature information with a dimension the same as a dimension of the second feature information back to the first feature combination layer 2322 in the second neural network 232. The first feature combination layer 2322 is for combining the first feature information (i.e., heatmap feature information) and the second feature information (i.e., picture feature information), to obtain the combined feature information. Last, the target detection layer 2323 in the second neural network 232 acquires a target detection result 233 based on the combined feature information.

As described above, by using neural networks (including the first neural network 231 and the second neural network 232) for target detection according to an embodiment of the present disclosure, target detection of the to-be-detected image that is inputted is implemented, meanwhile outputting of the target detection result 233 and the heat target prediction result 234 with a high accuracy is achieved.

Figure 7:
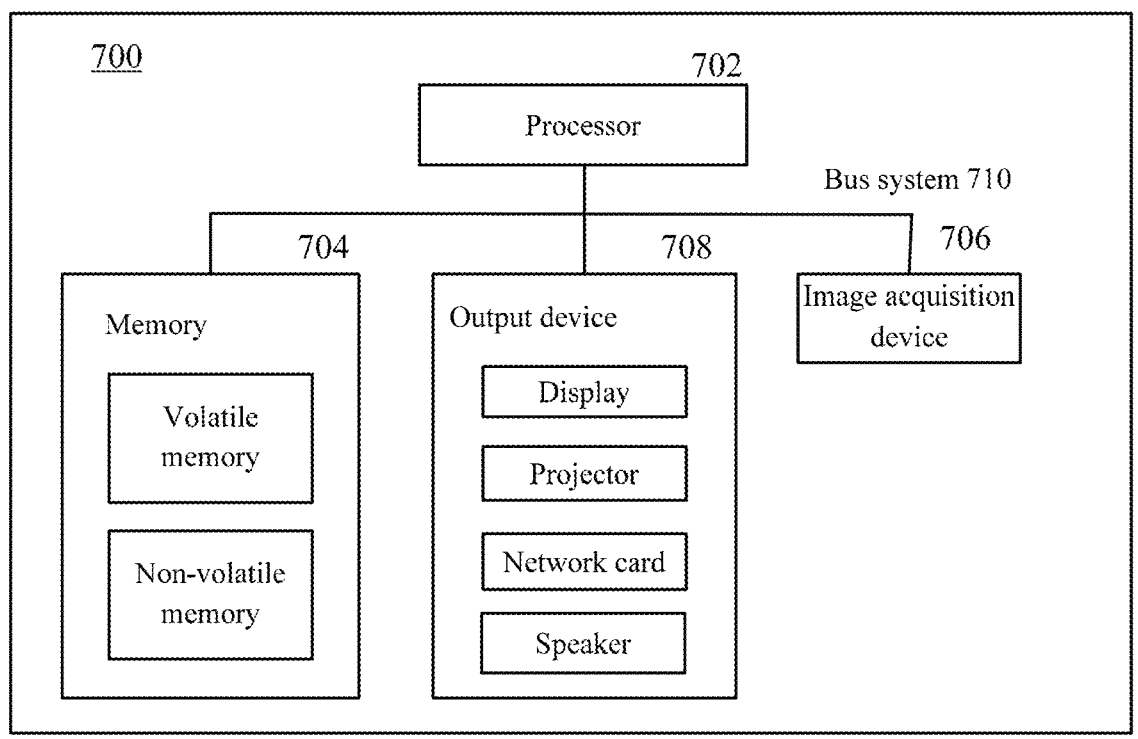
FIG. 7 is a schematic diagram illustrating a target detection device according to an embodiment of the present disclosure.

FIG. 7 is a schematic diagram illustrating a target detection device according to an embodiment of the present disclosure.

As shown in FIG. 7, the target detection apparatus 700 according to an embodiment of the present disclosure comprises one or more processors 702, a memory 704, an image acquisition device 1230, and an output device 1240, these components are interconnected via a bus system 710 and/or other forms of connection mechanism (not shown). It should be noted that the components and structure of the target detection apparatus shown in FIG. 7 are merely exemplary, rather than restrictive, the target detection apparatus may also have other components and structures as desired.

The processor 702 may be a central processing unit (CPU) or other forms of processing unit having data processing capability and/or instruction executing capability and also capable of controlling other components in the target detection apparatus 700 to execute intended functions.

The memory 704 may include one or more computer program products, the computer program product may include various forms of computer readable storage medium, such as volatile memory and/or non-volatile memory. The volatile memory may include, for example, random access memory (RAM) and/or cache. The non-volatile memory may include, for example, read only memory (ROM), hard disk, flash memory. One or more computer program instructions may be stored on the computer-readable storage medium, and the processor 702 can run the program instructions to implement the following steps: acquiring a to-be-detected image that contains a target; acquiring first feature information of the to-be-detected image by use of a first neural network that has been trained in advance, acquiring second feature information of the to-be-detected image by use of a second neural network that has been trained in advance; combining the first feature information and the second feature information to acquire combined feature information; and acquiring a target detection result by use of the second neural network and based on the combined feature information. In addition, one or more computer program instructions stored in the readable storage medium can execute all the steps of the target detection method and the training method of a neural network for target detection as described above with reference to the drawings, when being run by the processor 702. Various applications and various data may also be stored in the computer-readable storage medium, such as the inputted training images, the loss function, the prediction confidence and the true confidence of each pixel etc.

The image acquisition device 706 may be used to acquire training images with a training object and a to-be-detected image for target detection, and store a captured image in the memory 704 for use by other components. Of course, other image acquisition devices may also be used to acquire the training images and the to-be-detected image, and send the acquired image to the object detection device 700. The output device 708 may output various types of information, such as image information, training result, and heat target prediction result, and target detection result, to the external (e.g., users). The output device 708 may include one or more of a display, a speaker, a projector, a network card, or the like.

Figure 8:
FIG. 8 is a schematic diagram illustrating a target detection result according to an embodiment of the present disclosure.

FIG. 8 is a schematic diagram illustrating a target detection result according to an embodiment of the present disclosure.

An upper portion 801 of FIG. 8 shows that the target detection box is cluttered and contains a large number of pseudo targets in the case where target detection is performed without the aid of the heatmap feature. A middle portion 802 of FIG. 8 shows the heat target prediction result outputted by the first neural network in the target detection apparatus according to the present disclosure, wherein a higher gradation of a pixel dot represents a higher confidence of existence of a target at this pixel dot. A lower portion 803 of FIG. 8 shows the target detection result outputted by the second neural network in the object detection device according to the present disclosure, in comparison to the target detection result outputted without using the target detection apparatus as shown in the upper portion 801 of FIG. 8, the second neural network, which uses the heatmap to assist in training and detection, outputs a more accurate target detection box.

In the above, target detection method and device based on a neural network and training method and device of a neural network for target detection are described with reference to the drawings. By using the first neural network training that uses position information to assist in generating a heatmap and the subsequent second neural network training that uses the heatmap to assist in generating a target position, and further iterating the first neural network training and the second neural network training until trained neural networks are obtained, the trained neural networks perform heatmap and target position detection on a to-be-detected image, in order to achieve higher detection accuracy.

Basic principles of the present disclosure have been described in connection with specific embodiments, but it is to be noted that the merits, advantages, effects etc. mentioned in the present disclosure are merely illustrative, not restrictive, and these merits, advantages, effects etc. cannot be considered as must be provided by respective embodiments of the present disclosure. In addition, specific details disclosed in the above are for illustrative purposes only and are intended to facilitate understanding, not restrictive, and the foregoing details are not to be construed as limiting that the present disclosure must be implemented with the forgoing specific details.

Block diagrams of the device, apparatus, equipment, system involved in the present disclosure are by way of example only and are not intended to request or imply that connection, arrangement, and configuration must be performed in the manner shown in the block diagrams. As will be appreciated by those skilled in the art, such device, apparatus, equipment, system may be connected, arranged, and configured in any manner. Words such as "including", "comprising", "having" and the like are open words that refer to "including but not limited to", they can be used interchangeably. Words "or" and "and" used here refer to "and/or", they can be used interchangeably, unless the context clearly dictates otherwise. The word "such as" used here refers to "such as but not limited to", and they may be used interchangeably.

In addition, as used herein, "or" contained in item enumeration starting with the term "at least one" refers to separated enumeration, such as an enumeration of "at least one of A, B or C" means A or B or C, or AB or AC or BC, or ABC (i.e., A and B and C). In addition, the phrase "exemplary" does not mean that the described example is preferred or better than other examples.

It is also to be noted that in the system and method of the present disclosure, components, components or steps may be decomposed and/or recombined. These decomposition and/or recombination shall be considered as equivalent solutions of the present disclosure.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The foregoing description has been presented for purposes of illustration and description. Furthermore, the description is not intended to limit embodiments of the invention to the form disclosed herein. Although a number of exemplary aspects and embodiments have been discussed above, a person of skill in the art will recognize certain variations, modifications, permutations, additions, and sub-combinations thereof.

What is claimed is:

1. A target detection method, comprising:
acquiring a to-be-detected image that contains a target;
acquiring first feature information of the to-be-detected image by use of a first neural network that has been trained in advance, acquiring second feature information of the to-be-detected image by use of a second neural network that has been trained in advance;
combining the first feature information and the second feature information to acquire combined feature information; and
acquiring a target detection result by use of the second neural network and based on the combined feature information,
wherein the number of layers of the second neural network is larger than the number of layers of the first neural network, the first feature information is heatmap feature information, and the second feature information is picture feature information.

2. The target detection method according to claim 1, further comprising:
training the first neural network and the second neural network.

3. The target detection method according to claim 2, wherein training the first neural network and the second neural network comprises:
- adjusting a first network parameter of the first neural network by use of training images labeled with training targets to train the first neural network until a first loss function of the first neural network satisfies a first predetermined threshold condition, and obtaining the first neural network that is being trained;
- adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

4. The target detection method according to claim 3, wherein training the first neural network and the second neural network further comprises:
- repeating execution of the following training:
  - adjusting the first network parameter by use of the training images and training second feature information outputted with respect to the training images by the second neural network that is being trained, to train the first neural network; and
  - adjusting the second network parameter by use of the training images and the training first feature information outputted with respect to the training images by the first neural network that is being trained, to train the second neural network,
- until both the first loss function and the second loss function satisfy a third predetermined threshold condition, obtaining the trained first neural network and the trained second neural network.

5. The target detection method according to claim 3, wherein
- the first loss function indicates a difference between a prediction confidence of a pixel dot in the training images belongs to a training target as predicted by the first neural network and a true confidence thereof, and
- the second loss function indicates a difference between a prediction confidence of a target in the training images as predicted by the second neural network and a true confidence thereof, and a difference between a prediction confidence of a bounding box that contains the target and a true confidence thereof.

6. The target detection method according to claim 1, wherein
- the second neural network comprises:
  - a feature input layer for acquiring the second feature information based on the to-be-detected image that is inputted;
  - a first feature combination layer for combining the first feature information and the second feature information to acquire the combined feature information; and
  - a target detection layer for acquiring a target detection result based on the combined feature information; and
- the first neural network comprises:
  - a feature conversion layer for acquiring conversion feature information based on the second feature information; and
  - a heat detection layer for acquiring the first feature information based on the conversion feature information.

7. The target detection method according to claim 6, wherein
- the first neural network further comprises
  - an upsampling layer for upsampling the conversion feature information such that the heat detection layer receives upsampled conversion feature information with a size the same as a size of the to-be-detected image;
- the heat detection layer comprises:
  - a second feature combination layer for receiving the upsampled conversion feature information to generate initial first feature information;
  - a downsampling layer for downsampling the initial first feature information to obtain the first feature information with a dimension the same as a dimension of the second feature information; and
  - a heat target prediction layer for obtaining a heat target prediction result based on the initial first feature information.

8. A training method of a neural network for target detection, the neural network for target detection comprising a first neural network and a second neural network, the training method comprising:
- adjusting a first network parameter of the first neural network by use of training images labeled with training targets to train the first neural network until a first loss function of the first neural network satisfies a first predetermined threshold condition, and obtaining the first neural network that is being trained;
- adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained,
- wherein the first neural network is for acquiring first feature information of the to-be-detected image, the second neural network is for acquiring second feature information of the to-be-detected image; and
- the second neural network further combines the first feature information and the second feature information to acquire combined feature information, and acquires a target detection result by use of the second neural network and based on the combined feature information, and
- the number of layers of the second neural network is larger than the number of layers of the first neural network, the first feature information is heatmap feature information, and the second feature information is picture feature information.

9. The training method according to claim 8, further comprising:
- repeating execution of the following training:
  - adjusting the first network parameter by use of the training images and training second feature information outputted with respect to the training images by the second neural network that is being trained, to train the first neural network; and
  - adjusting the second network parameter by use of the training images and the training first feature information outputted with respect to the training images by the first neural network that is being trained, to train the second neural network,
- until both the first loss function and the second loss function satisfy a third predetermined threshold condition, obtaining the trained first neural network and the trained second neural network.

10. The training method according to claim 8, wherein the first loss function indicates a difference between a prediction confidence of a pixel dot in the training images belongs to a training target as predicted by the first neural network and a true confidence thereof, and the second loss function indicates a difference between a prediction confidence of a target in the training images as predicted by the second neural network and a true confidence thereof, and a difference between a prediction confidence of a bounding box that contains the target and a true confidence thereof.

11. The training method according to claim 8, wherein the second neural network comprises:
   a feature input layer for acquiring the second feature information based on the to-be-detected image that is inputted;
   a first feature combination layer for combining the first feature information and the second feature information to acquire the combined feature information; and
   a target detection layer for acquiring a target detection result based on the combined feature information; and
the first neural network comprises:
   a feature conversion layer for acquiring conversion feature information based on the second feature information; and
   a heat detection layer for acquiring the first feature information based on the conversion feature information.

12. The training method according to claim 11, wherein the first neural network further comprises
   an upsampling layer for upsampling the conversion feature information such that the heat detection layer receives upsampled conversion feature information with a size the same as a size of the to-be-detected image;
the heat detection layer comprises:
   a second feature combination layer for receiving the upsampled conversion feature information to generate initial first feature information;
   a downsampling layer for downsampling the initial first feature information to obtain the first feature information with a dimension the same as a dimension of the second feature information; and
   a heat target prediction layer for obtaining a heat target prediction result based on the initial first feature information.

13. A target detection device, comprising:
a processor;
a memory; and
computer program instructions stored in the memory and configured to execute, when being run by the processor, steps of:
acquiring a to-be-detected image that contains a target;
acquiring first feature information of the to-be-detected image by use of a first neural network that has been trained in advance, acquiring second feature information of the to-be-detected image by use of a second neural network that has been trained in advance;
combining the first feature information and the second feature information to acquire combined feature information; and
acquiring a target detection result by use of the second neural network and based on the combined feature information,
wherein the number of layers of the second neural network is larger than the number of layers of the first neural network, the first feature information is heatmap feature information, and the second feature information is picture feature information.

14. The target detection device according to claim 13, wherein a step of training the first neural network and the second neural network is executed when the computer program instructions are run by the processor:
   wherein the step of training the first neural network and the second neural network executed when the computer program instructions are run by the processor comprises:
   adjusting a first network parameter of the first neural network by use of training images labeled with training targets to train the first neural network until a first loss function of the first neural network satisfies a first predetermined threshold condition, and obtaining the first neural network that is being trained;
   adjusting a second network parameter of the second neural network by use of the training images and training first feature information outputted with respect to the training images by the first neural network, to train the second neural network until a second loss function of the second neural network satisfies a second predetermined threshold condition, and obtaining the second neural network that is being trained.

15. The target detection device according to claim 14, wherein the step of training the first neural network and the second neural network executed when the computer program instructions are run by the processor further comprises:
   repeating execution of the following training:
      adjusting the first network parameter by use of the training images and training second feature information outputted with respect to the training images by the second neural network that is being trained, to train the first neural network; and
      adjusting the second network parameter by use of the training images and the training first feature information outputted with respect to the training images by the first neural network that is being trained, to train the second neural network,
   until both the first loss function and the second loss function satisfy a third predetermined threshold condition, obtaining the trained first neural network and the trained second neural network,
   wherein the first loss function indicates a difference between a prediction confidence of a pixel dot in the training images belongs to a training target as predicted by the first neural network and a true confidence thereof, and
   the second loss function indicates a difference between a prediction confidence of a target in the training images as predicted by the second neural network and a true confidence thereof, and a difference between a prediction confidence of a bounding box that contains the target and a true confidence thereof.

16. The target detection device according to claim 13, wherein
the second neural network comprises:
   a feature input layer for acquiring the second feature information based on the to-be-detected image that is inputted;

a first feature combination layer for combining the first feature information and the second feature information to acquire the combined feature information; and a target detection layer for acquiring a target detection result based on the combined feature information; and the first neural network comprises:

a feature conversion layer for acquiring conversion feature information based on the second feature information; and a heat detection layer for acquiring the first feature information based on the conversion feature information.

17. The target detection method according to claim 16, wherein the first neural network further comprises an upsampling layer for upsampling the conversion feature information such that the heat detection layer receives upsampled conversion feature information with a size the same as a size of the to-be-detected image;

the heat detection layer comprises:

a second feature combination layer for receiving the upsampled conversion feature information to generate initial first feature information;

a downsampling layer for downsampling the initial first feature information to obtain the first feature information with a dimension the same as a dimension of the second feature information; and a heat target prediction layer for obtaining a heat target prediction result based on the initial first feature information.

* * * * *